United States Patent [19]

Kikuda

[11] Patent Number: 4,952,785
[45] Date of Patent: Aug. 28, 1990

[54] BAR CODE GENERATING APPARATUS FOR IMAGE COMMUNICATION TERMINAL DEVICE

[75] Inventor: Yukio Kikuda, Kumagaya, Japan

[73] Assignee: Kabushiki Kaisha Toshiba, Kawasaki, Japan

[21] Appl. No.: 188,465

[22] Filed: Apr. 29, 1988

[30] Foreign Application Priority Data

May 1, 1987 [JP] Japan .................................. 62-108502

[51] Int. Cl.[5] .......................... G06F 15/12; G06K 3/12
[52] U.S. Cl. ...................................... 235/432; 235/375; 235/462; 358/335
[58] Field of Search ................. 358/335, 342; 235/375, 235/462, 472, 432

[56] References Cited

U.S. PATENT DOCUMENTS

| | | |
|---|---|---|
| 4,368,486 | 1/1983 | Degoulet et al. . |
| 4,621,259 | 11/1986 | Schepers et al. ................ 358/335 X |
| 4,652,733 | 3/1987 | Eng et al. .............................. 235/462 |
| 4,694,357 | 9/1987 | Rahman et al. ................. 358/335 X |
| 4,731,525 | 3/1988 | Hice ...................................... 235/472 |
| 4,802,018 | 1/1989 | Tanikawa et al. ............... 358/342 X |
| 4,831,610 | 5/1989 | Hoda et al. ....................... 358/342 X |

FOREIGN PATENT DOCUMENTS

| | | |
|---|---|---|
| 0145677 | 6/1985 | European Pat. Off. . |
| 0156709 | 10/1985 | European Pat. Off. . |
| 0190837 | 8/1986 | European Pat. Off. . |
| 0194143 | 9/1986 | |

OTHER PUBLICATIONS

H. Eckhard Kruger, "Das digitale Fernsehkennungssystem ZPS", NTZ, vol. 35, No. 6, 1982, Berlin, pp. 368-376.

*Primary Examiner*—David L. Trafton
*Attorney, Agent, or Firm*—Cushman, Darby & Cushman

[57] ABSTRACT

An extraction section receives image information including frame number information, and extracts the frame number information from the received information. A bar code generator receives the frame number information output from the extraction section and, in response to an instruction from an instruction section, generats a bar code signal corresponding to the frame number information, the bar code signal being externally output, in printed form, by an output section connected to the bar code generator.

27 Claims, 11 Drawing Sheets

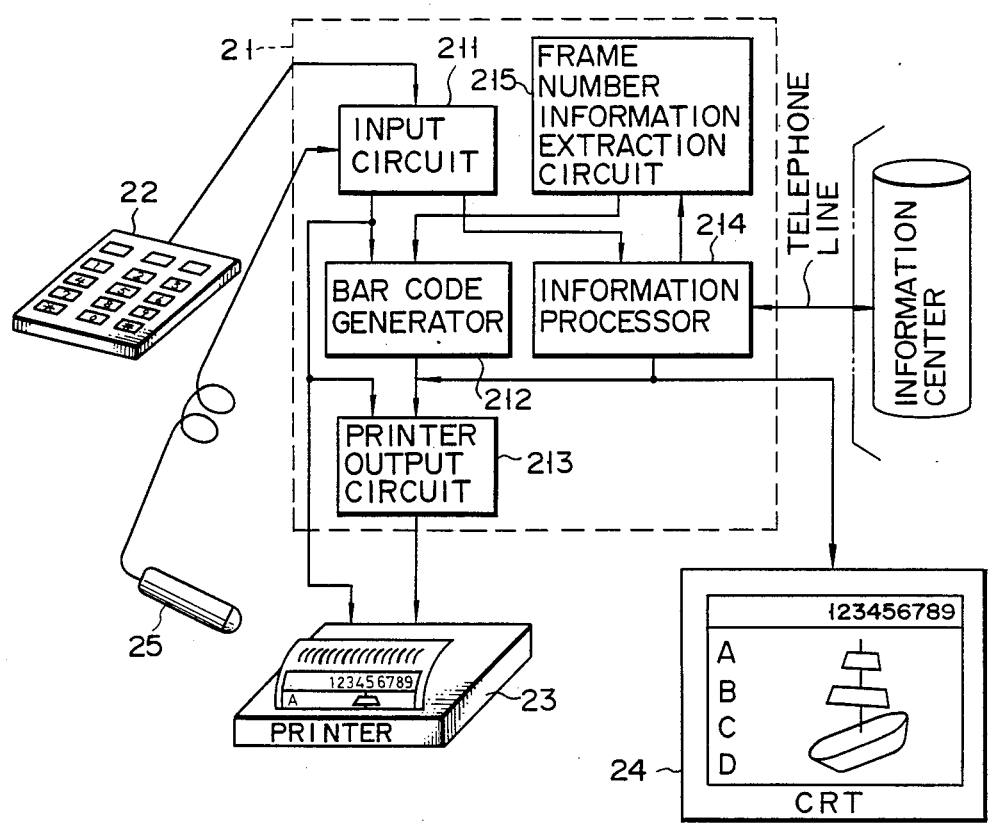
F I G. 4
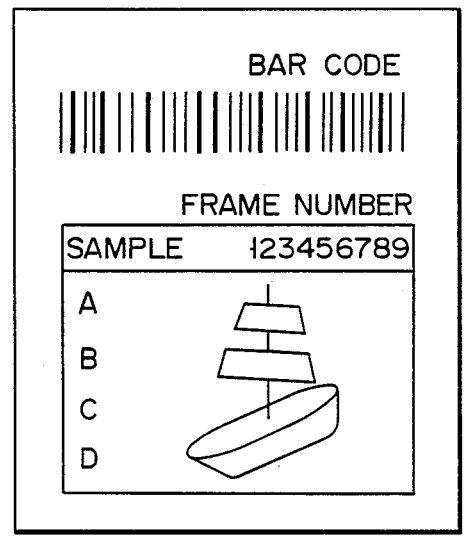
F I G. 5

| CHARACTER | BAR CODE PATTERN | | | | | | | | | | | |
|---|---|---|---|---|---|---|---|---|---|---|---|---|
| 0 | 1 | 0 | 1 | 0 | 1 | 0 | 0 | 1 | 1 | 0 | 0 | |
| 1 | 1 | 0 | 1 | 0 | 1 | 1 | 0 | 0 | 1 | 0 | 0 | |
| 2 | 1 | 0 | 1 | 0 | 0 | 1 | 0 | 1 | 1 | 0 | 0 | |
| 3 | 1 | 1 | 0 | 0 | 1 | 0 | 1 | 0 | 1 | 0 | 0 | |
| 4 | 1 | 0 | 1 | 1 | 0 | 1 | 0 | 0 | 1 | 0 | 0 | |
| 5 | 1 | 1 | 0 | 1 | 0 | 1 | 0 | 0 | 1 | 0 | 0 | |
| 6 | 1 | 0 | 0 | 1 | 0 | 1 | 0 | 1 | 1 | 0 | 0 | |
| 7 | 1 | 0 | 0 | 1 | 0 | 1 | 1 | 0 | 1 | 0 | 0 | |
| 8 | 1 | 0 | 0 | 1 | 1 | 0 | 1 | 0 | 1 | 0 | 0 | |
| 9 | 1 | 1 | 0 | 1 | 0 | 0 | 1 | 0 | 1 | 0 | 0 | |
| START STOP | 1 | 0 | 1 | 1 | 0 | 0 | 1 | 0 | 0 | 1 | 0 | 0 |

F I G. 10

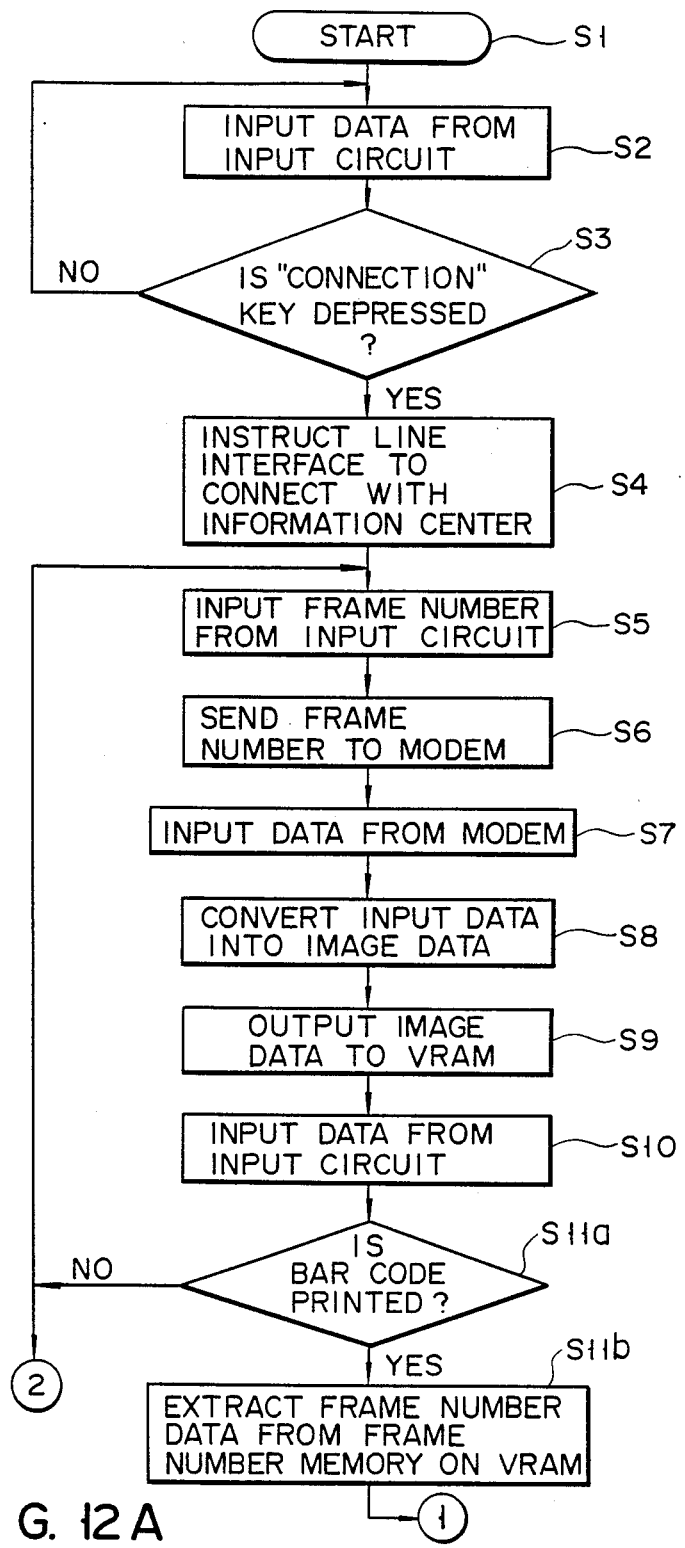
F I G. 12A

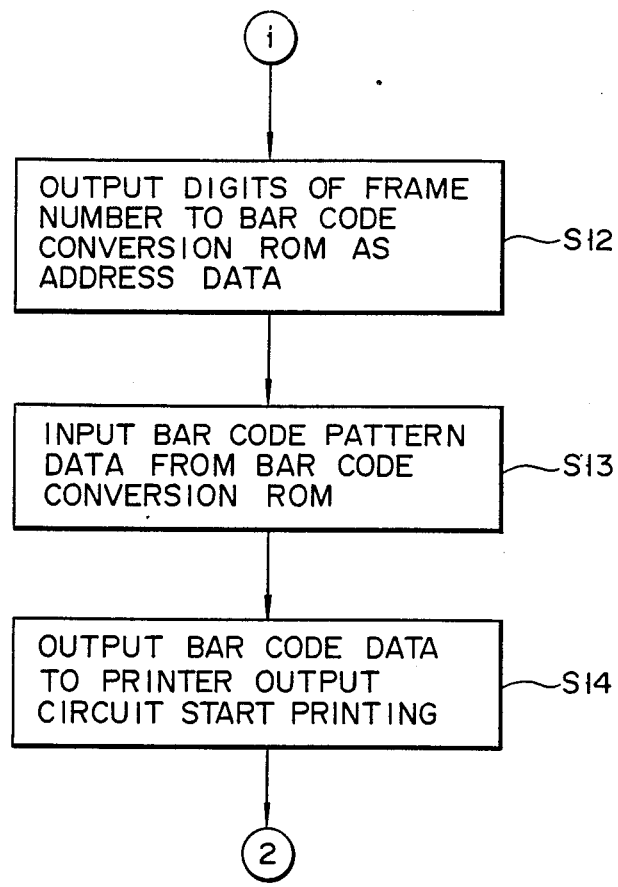
F I G. 12B

BAR CODE GENERATING APPARATUS FOR IMAGE COMMUNICATION TERMINAL DEVICE

BACKGROUND OF THE INVENTION

1. Field of the Invention

This invention generally relates to a bar code generating apparatus for an image communication terminal device and, more particularly, to a bar code generating apparatus having a function for generating a bar code used for frame access to an information center of an image communication terminal of an image communication system such as a videotex system.

2. Description of the Related Art

As is well known, subscribers to an image communication system such as a videotex system are connected to an information center through thereof telephone lines. Each subscriber calls the center from his terminal (videotex adapter) to access desired image information, and the center then transfers the accessed image information to the subscriber's terminal, where it is displayed on a CRT display connected thereto.

In such a system, each time a subscriber accesses desired image information, he must key-input a frame number (e.g., nine digits) assigned to each of a large volume of information stored in the center. Therefore, since this conventional system entails a cumbersome key operation for each accessing of the terminal, the system's operability cannot be described as ideal.

In a recently introduced videotex system, an image communication terminal device has been developed which is capable of accessing a desired frame number using a bar code, in this particular case, bar codes printed in related information magazines.

However, since such information magazines seldom include the bar code of every frame number of information stored in an information center, the number of bar codes available, and thus the amount of information which can be accessed speedily, is therefore limited. For example, while a user of an information communication system is accessing a variety of frame information transferred from an information center, he comes across some frame information which he wishes to access a number of thereafter. However, if the bar code which corresponds to the frame information in question is not listed in any information magazine, he must then access that frame information each time by way of a cumbersome a key operation.

A service by which bar codes can be printed out by utilizing an image communication terminal device having a printer output function has been available for some time. When using this service, a user inputs a target frame number by key operations and sends it to an information center, which then supplies bar code information of the input number, the bar code information is output to a printer connected to the terminal, and is printed. Using the printed bar code, the user can now directly access the target frame information.

However, with this arrangement, in order to print a bar code, a user must request bar code information from the information center, thereby incurring a high communication charge.

SUMMARY OF THE INVENTION

It is, therefore, an object of the present invention to provide a new and improved bar code generating apparatus for an image communication terminal device where subscribers do not incur a communication charge for bar code requests, and can generate bar codes for accessing image information easily and reliably.

According to the present invention, there is provided a bar code generating apparatus for an image communication terminal device, the apparatus comprising:

extraction means for receiving image information including frame number information and extracting the frame number information;

bar code generating means for receiving the frame number information output from the extraction means and generating a corresponding bar code;

instruction means for instructing the bar code generating means to generate the bar code corresponding to the frame number information; and output means, connected to the bar code generating means, for externally outputting the bar code corresponding to the frame number information generated by the bar code generating means, in response to the instruction from the instruction means, so as to print the bar code.

BRIEF DESCRIPTION OF THE DRAWINGS

These and other objects and features of the present invention can be understood through the following embodiments by reference to the accompanying drawings, in which:

FIG. 4 is a block diagram showing an arrangement of the bar code generating apparatus according to an embodiment of the present invention;

FIG. 5 is a view for explaining a printing format of the printer shown in FIG. 4;

FIG. 10 is a view showing a bar code pattern;

FIGS. 12A and 12B are flow charts for explaining the operation of FIG. 11.

DETAILED DESCRIPTION OF THE PREFERRED EMBODIMENTS

Figure 1A:
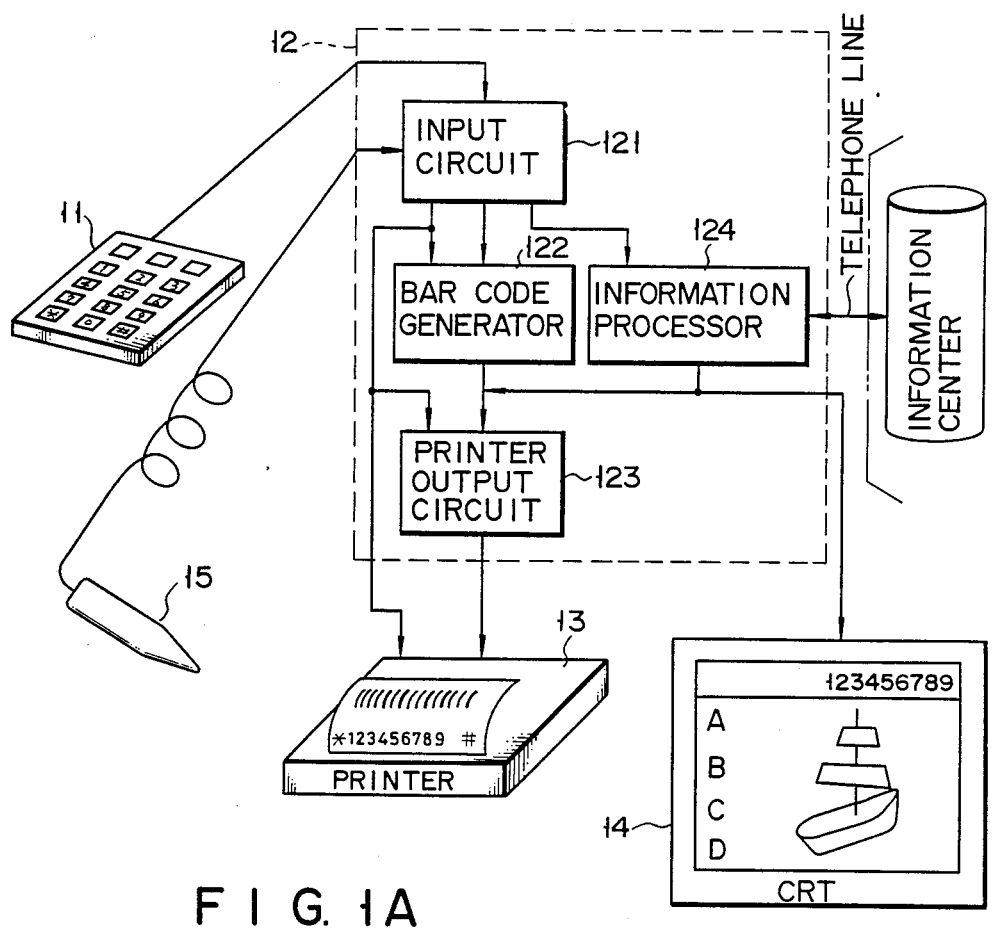
FIG. 1A is a block diagram for explaining a basic arrangement of the present invention.

First, a basic arrangement of the present invention will be described hereinafter.

In order to solve the above-mentioned problems, the present inventors proposed an image communication terminal device having not only a bar code print-out function but also a bar code generating function. An image communication terminal device processing having such functions is as shown in FIG. 1A.

Bar code generation and print-out processing operations which take place in the terminal device shown in FIG. 1A will now be described below.

Processing starts when a user operates key pad 11 of terminal device body 12 to instruct a print mode. More specifically, when a key input for setting the print mode is made, input circuit 121 for decoding the key input from key pad 11 sets bar code generator 122, print output circuit 123, and printer 13—the latter connected to device body 12—in a bar code generating mode. The user then operates key pad 11 again, this time to input a target frame number in terminal device body 12, input circuit 121 decodes the key input and supplies decoded data to bar code generator 122. Bar code generator 122 then generates a bar code corresponding to the input from input circuit 121, and supplies it to printer output circuit 123. Printer output circuit 123 converts the input bar code data into printing bar code data, and supplies it to printer 13, which then prints the bar code. In FIG. 1A, reference numeral 14 denotes a CRT display—connected to terminal device body 12—for displaying image data, and numeral 15, a bar code reader for accessing bar codes.

Note that in FIG. 1A, reference numeral 124 denotes an information processing circuit for exchanging information with an information center and for decoding frame information from the information center and displaying decoded information on CRT display 14 connected to device body 12.

Since, according to the image communication terminal device shown in FIG. 1A, a bar code is generated inside the terminal device, this eliminates the need for any communication charge to subscribers for bar code printing.

Nevertheless, the problem associated with a terminal device which receives bar code information from the information center also remains unsolved in the case of the device shown in FIG. 1A. More specifically, in order to designate a bar code for internal generation and printing by the terminal, the user must first know the plurality of digits which make up the frame number in question, and then key-input them. This is clearly an inefficient, time-consuming operation, involving the possibility of an error on the part of the operator. If the operator forgets the frame number in question or makes a key-in error, in either case the above-mentioned print-out processing then cannot be performed. Consequently, it is highly desirable that this drawback be eliminated. A more detailed description of the above situation will now be given below.

Figure 1B:
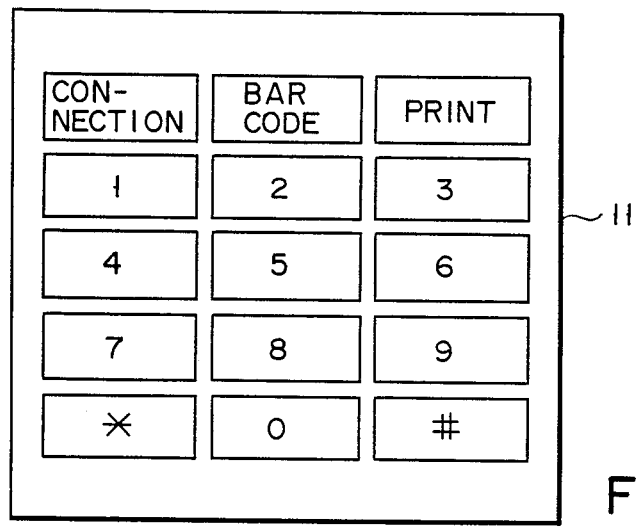
FIG. 1B is a view showing in detail a key pad shown in FIG. 1A.

As is shown in FIG. 1B, key pad 11 includes a "CONNECTION" key for instructing connection between terminal device body 12 and a target information center, a "BAR CODE" key for starting bar code generator 122, a "PRINT" key for starting printer 13 and printer output circuit 123, and "0" to "9", "*", and "#" keys used for retrieving target image information.

First, a user depresses the "CONNECTION" key of key pad 11. The resultant input signal is decoded by input circuit 121, and sent to information processor 124. In this way, terminal device body 12 is connected to the target information center via a telephone line. Next, the user selects a target frame from among several millions of data stored in the information center. For example, in order to obtain data of a frame number "123456789", he must depress the "*", "1", "2", "3", "4", "5", "6", "7", "8", "9", and "#" keys of key pad 11, and the input information is sent, as frame access information, to the information center through information processor 124. In the information center, the number is analyzed, and information relating to that number is sent back to terminal device body 12, where it is converted to image data by information processor 124, and displayed on CRT display 14. In this manner, the user can obtain any target information desired.

However, each accessing of a frame number still requires that the user depress a large number of keys, and do so correctly. So as to eliminate this drawback, and to enable target information to be obtained more quickly, the bar code access method has been proposed. According to this system, the bar code corresponds to keys on key pad 11 in accordance with its bar pattern. In accordance with combinations of bar patterns, all the information numbers stored in the information center can be displayed. The user need only scan a bar code printed in an information magazine using bar code reader 15 to obtain target information more quickly and reliably than he could by accessing it by means of the key pad.

When a needed bar code is not listed in an information magazine, bar code generator 122, arranged in terminal device body 12, can then be used to generate the bar code required, by means of the user operating the "BAR CODE" key on key pad 11, after which he depresses the "*" key, enters the numerals making up the bar code, depress the "#" key, and finally, the "PRINT" key, whereby the desired bar code is printed out.

Figure 2:
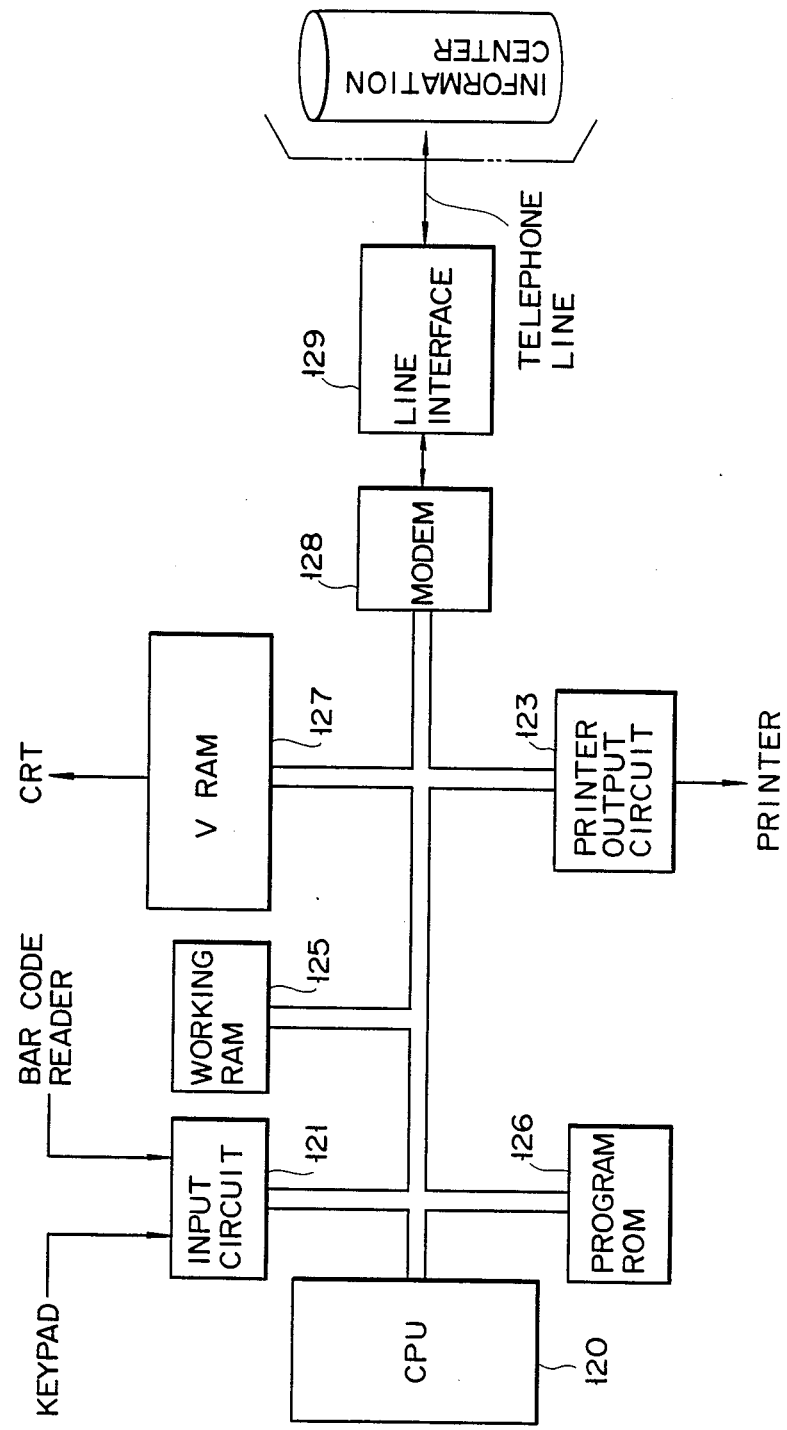
FIG. 2 is a block diagram showing a case wherein a CPU is used for the ,basic arrangement shown in FIG. 1A.

FIG. 2 is a block diagram showing a case wherein terminal device body 12 of the basic arrangement is controlled by microcomputer (CPU) 120. The same reference numerals in FIG. 2 denote the same parts as in FIG. A. More specifically, CPU 120 incorporates bar code generator 122 and information processor 124, and controls entire terminal device body 12. CPU 120 is connected to input circuit 121, printer output circuit 123, working RAM 125, program ROM 126, VRAM 127, and MODEM 128, via a bus. VRAM 127 is connected to CRT display 14, and MODEM 128 is connected to a telephone line, and thence to the information center, via line interface 129.

Figure 3A:
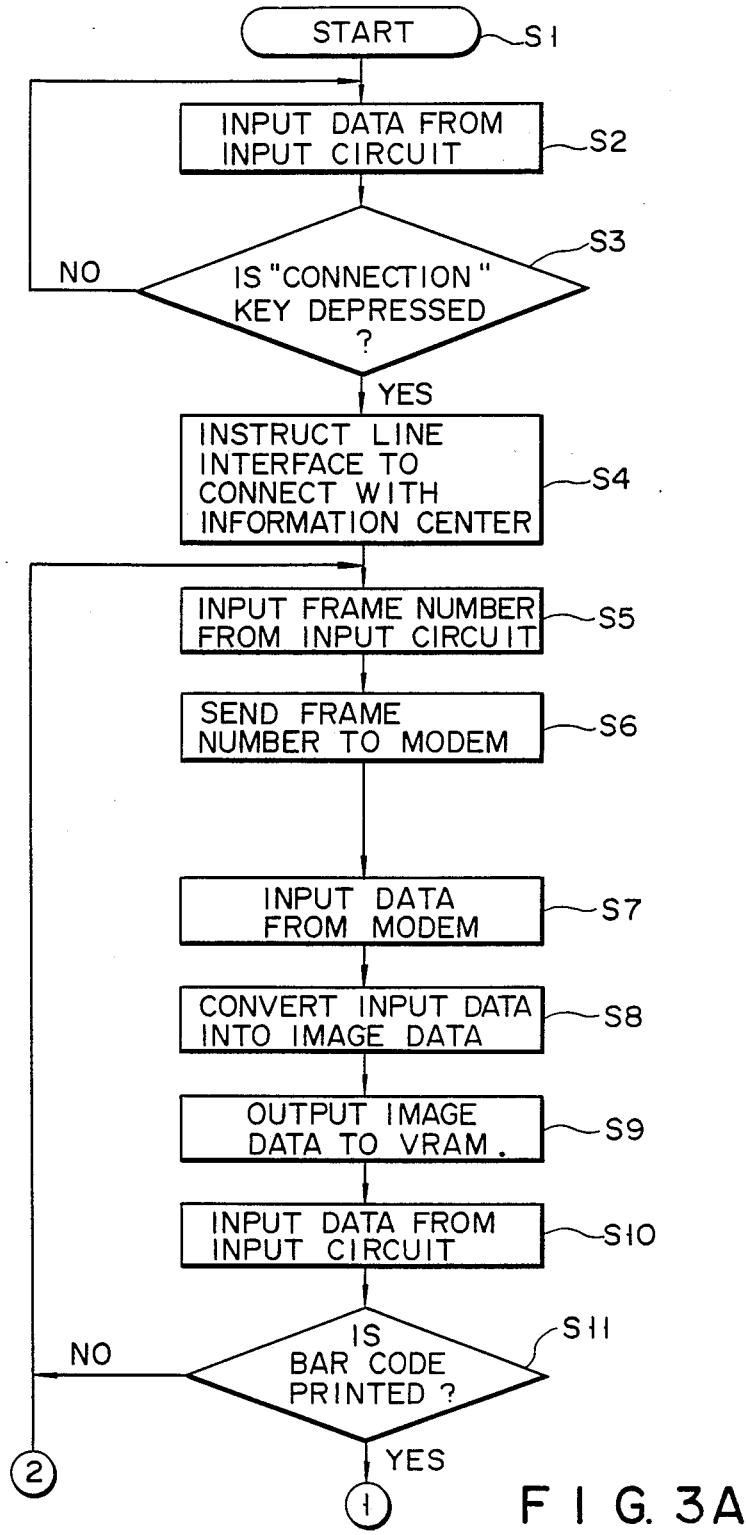
FIGS. 3A and 3B are flow charts for explaining an operation of FIG. 2.
Figure 3B:
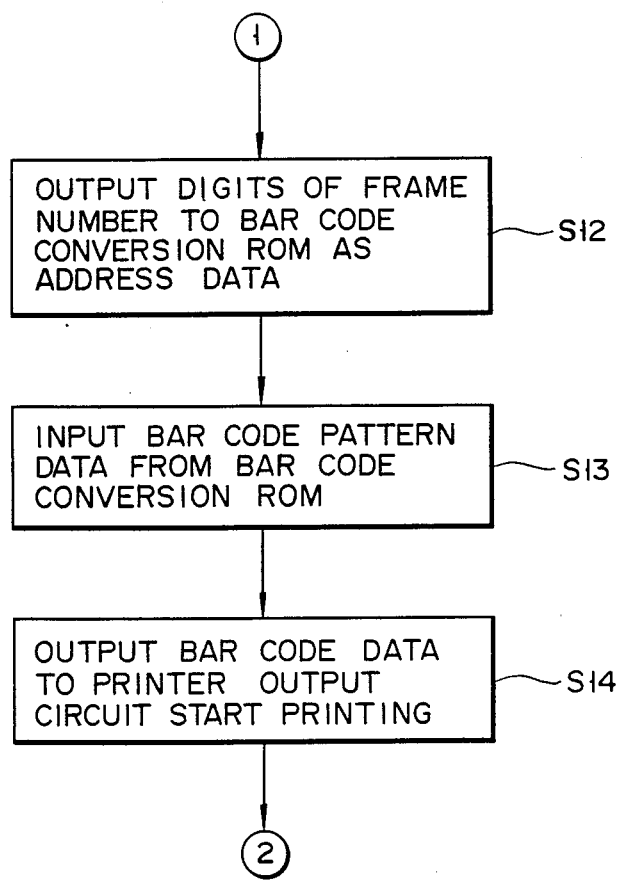

FIGS. 3A and 3B are flow charts showing a series of operations executed by CPU 120. First, a connection process is executed by depressing the "CONNECTION" key, in steps S1 to S4. Next, a frame number-sending process is executed by depressing the "*", "1", "2", "3", "4", "5", "6", "7", "8", "9", and "#" keys, in steps S5 and S6. In step S7, an information-receiving process is executed, and in steps S8 and S9, an information-display process is executed. Then, a frame number data inputting process is executed by depressing the "BAR CODE" key and the "*", "1", "2", "3", "4", "5", "6", "7", "8", "9" and "#" keys, in steps S10 and S11. In steps S12 and S13, a bar code generating process is executed, followed by a bar code outputting process, in step S14.

Demand has now arisen for the incorporation, in the image communication terminal device having the bar code print-out function as described above, of a terminal device which facilitates user operations necessary for print-out processing as well as having an internal bar code generating function.

Accordingly, it is the aim of the present invention to provide a bar code generating apparatus for an image communication terminal device, which facilitates the operations required for designating a bar code for bar code generation and the subsequent bar code print-out processing.

The principle of the present invention employing the improved basic arrangement described above will now be described hereinafter.

This invention is based on the fact that frame information includes frame number information in an image communication system such as a videotex system. A bar code generating apparatus of this invention comprises a frame number information extraction circuit, a bar code generator, and a printer output circuit. The frame number information extraction circuit extracts frame number information from frame information supplied from the information center of a terminal in response to an instruction from the input circuit, and the bar code corresponding to the information extracted is generated by the bar code generator, and externally output by the printer output circuit.

As has been described above, according to the bar code generating apparatus of this invention, a bar code is generated in accordance with frame number information supplied from an information center to a terminal. As a result, user does not have to key-input a frame number. Thus, when frame information which the user may wish subsequently to access a number of times appears on the display connected to the terminal device, the user has only to instruct print-out processing to obtain that information while it is being displayed.

More specifically, assume that a user depresses the "CONNECTION" key to be connected to an information center, and finds some particularly useful information during communication with the center. At this time, the user need only depress the "BAR CODE" and "PRINT" keys without depressing several digits of the frame number. Then, the frame number information extraction circuit reads out the frame number of the target frame from an information processor, and sends the readout number to the bar code generator, where it is converted to a bar code pattern, and is output, via the printer output circuit, to a printer.

At this time, a frame currently displayed on the CRT can be simultaneously printed. Thus, the correspondence between the obtained bar code and information can be easily confirmed later.

An embodiment of the present invention will now be described hereinafter, with reference to the accompanying drawings.

FIG. 4 is a block diagram schematically illustrating an arrangement of the bar code generating apparatus according to an embodiment of the present invention.

Referring to FIG. 4, reference numeral 21 denotes a terminal device body which constitutes the core of an information communication terminal device; and 22, a wireless or wired key pad which is connected to terminal device body 21 and with which a user instructs print-out processing of a bar code to terminal device 21 or requests information transfer to an information center. Key pad 22 can be the same as that shown in FIG. 1B. Reference numeral 23 denotes a printer which is connected to the terminal device body 21 and prints bar codes.

Referring now to terminal device body 21, reference numeral 211 denotes an input circuit contained therein for decoding a key input from key pad 22 and for generating a variety of control signals. Reference numeral 212 denotes a bar code generator for generating a bar code corresponding to frame number information extracted by frame number information extraction circuit 215 (to be described later), reference numeral 213 denotes a printer output circuit for converting the bar code generated by bar code generator 212 into printing data, and reference numeral 214 denotes an information processor for exchanging information with the information center, for storing frame information from the information center in internal image memory 214a, for outputting frame information to CRT display 24 connected to terminal device body 21, in accordance with the storage information, and also for outputting the frame information to printer output circuit 213, as and then required. Reference numeral 215 denotes a frame number information extraction circuit for extracting frame number information from frame information stored in the image memory of information processor 214, and supplying extracted information to bar code generator 212. Note that reference numeral 25 denotes a bar code reader for reading a bar code printed on a magazine, or one printed by the bar code generating apparatus of this invention, when frame information is accessed using a bar code.

Bar code generating and print-out processing operations carried out by means of the above arrangement will now be described in detail below.

The bar code generating and print-out processing operations of this embodiment are performed while frame information supplied from the information center to a terminal, in response to a user request, is being displayed on a display of the terminal, the request having been made by the user performing a key-in operation using key pad 22. More specifically, when the transfer request is key-input, input circuit 211 sets information processor 214 in a display mode, as a result of which processor 214 requests the transfer of frame information from the information center, decoding the information upon receipt therefrom, and storing it in internal image memory 214a. In addition to these functions, information processor 214 also outputs the decoded frame information stored in image memory 214a to CRT display 24, for display thereon. To display frame information, frame number information extraction circuit 215 first reads out frame number information from image memory 214a, and supplies it to bar code generator 212. Extraction circuit 215 reads out frame number information for a predetermined cycle, and when frame information is updated, supplies frame number information of the updated frame information to bar code generator 212. In this case, extraction circuit 215 may be directly extract the frame number information from the image information.

In this manner, when the user instructs a bar code print mode by operating "bar code" and "print" keys on key pad 22 while target frame information is being displayed, generating and print-out processing operations of a target bar code can be executed. More specifically, when input circuit 211 detects a key input corresponding to the print instruction, it sets bar code generator 212, printer output circuit 213, and printer 23 in the print mode. In the print mode, generator 212 generates a bar code corresponding to frame number information supplied from extraction circuit 215. In the print mode, printer output circuit 213 converts the bar code supplied from generator 212 into printing data. Printer 23 prints the bar code using the data supplied from printer output circuit 213.

Note that printer output circuit 213 receives not only a bar code but also frame information received by information processor 214, as and when required. Therefore, when the print mode is set, printer 23 can print both the bar code and displayed image of the frame information, as shown in FIG. 5.

The schematic arrangement and operation of the embodiment have been described. Arrangements and of respective components will be described hereinafter in detail.

The operation of information processor 214 will be described with reference to FIGS. 6 and 7. Note that FIG. 6 shows part of frame information sent from the information center, and FIG. 7 shows a display screen on the CRT display 24.

Figure 6:
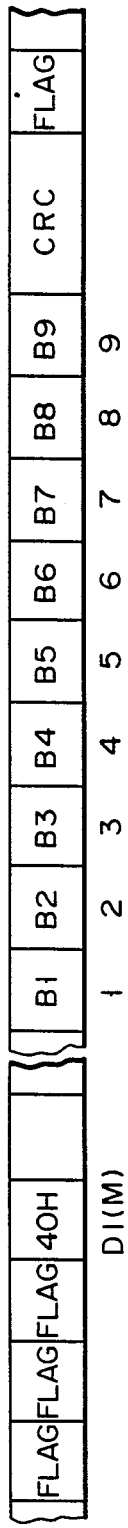
FIGS. 6 and 7 are views for explaining the operation of the information processing apparatus shown in FIG. 4.
Figure 7:
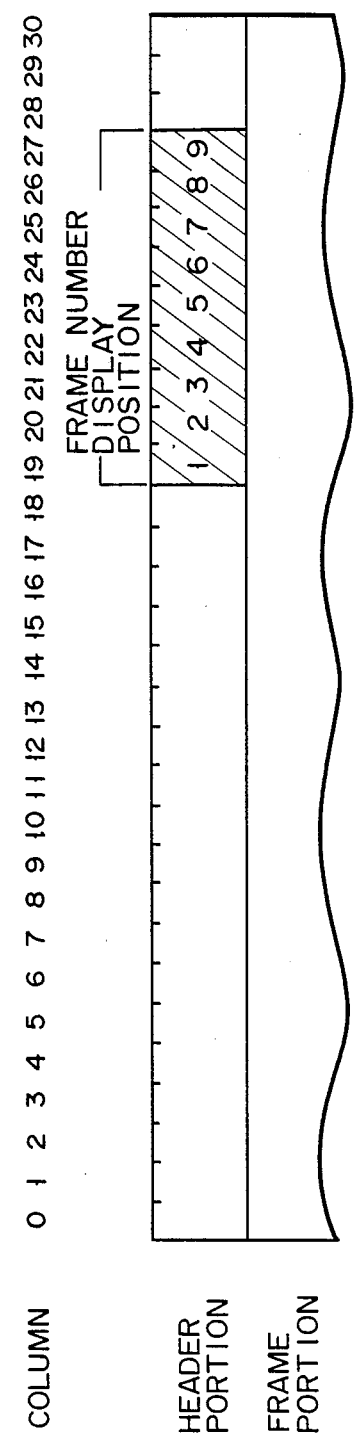

In the frame information, as shown in FIG. 6, flags are followed by an indicator DI(M) (=40H) in which data represent to be message information, and thereafter, header information including frame number information follows. FIG. 6 shows a frame number of nine digits "1, 2, 3, 4, 5, 6, 7, 8, 9". When information processor 214 which receives such frame information receives DI(M) immediately after it receives flags, it discriminates that the following information is header information (message), and stores it in image memory 214a. In this case, storage addresses of the frame number information correspond to frame number display positions of a header portion shown in FIG. 7. The frame number display positions are set in columns "19" to "27".

The arrangement and operation of frame number information extraction circuit 215 will be described hereinafter in detail with reference to FIG. 8. Note that FIG. 8 is a block diagram showing a detailed arrangement of extraction circuit 215.

Figure 8:
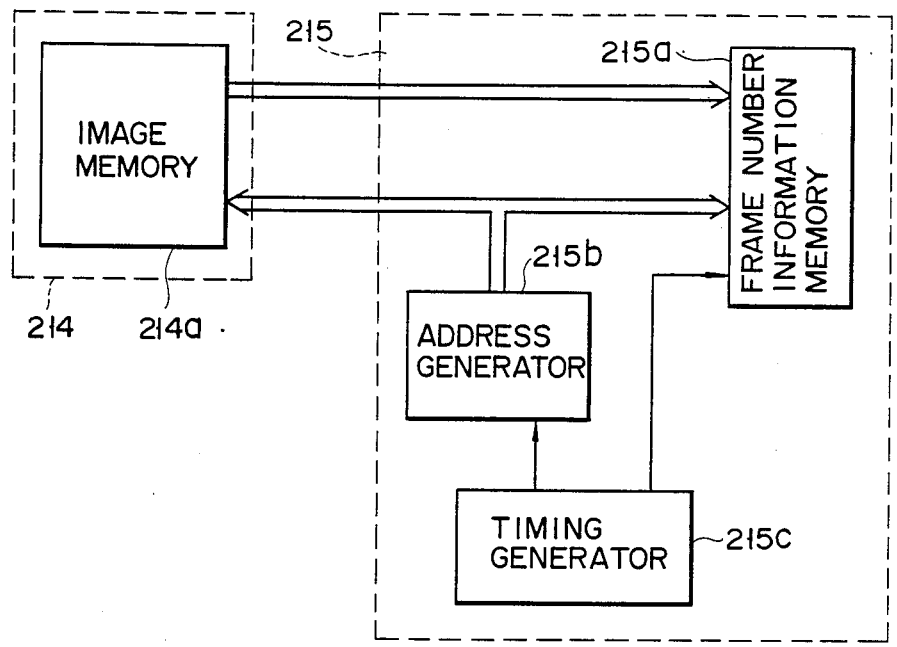
FIG. 8 is a block diagram showing a detailed arrangement of a frame number information extracting circuit shown in FIG. 4.

As shown in FIG. 8, extraction circuit 215 has frame number information memory 215a for storing extracted frame number information, and address generator 215b for generating address data used for fetching frame number information from image memory 214a of information processor 214, address data used for writing the fetched frame number information into frame number memory 215a, and address data for fetching frame number information from memory 215a. Timing generator 215c switches address data to be generated by address generator 215b in the order of read address data for image memory 214a, and write address data and read address data for frame number information memory 215a.

An arrangement and operation of bar code generator 212 will be described hereinafter in detail with reference to FIGS. 9 and 10. Note that FIG. 9 is a block diagram showing an arrangement of bar code generator 212, and FIG. 10 is a view showing a bar code pattern.

Figure 9:
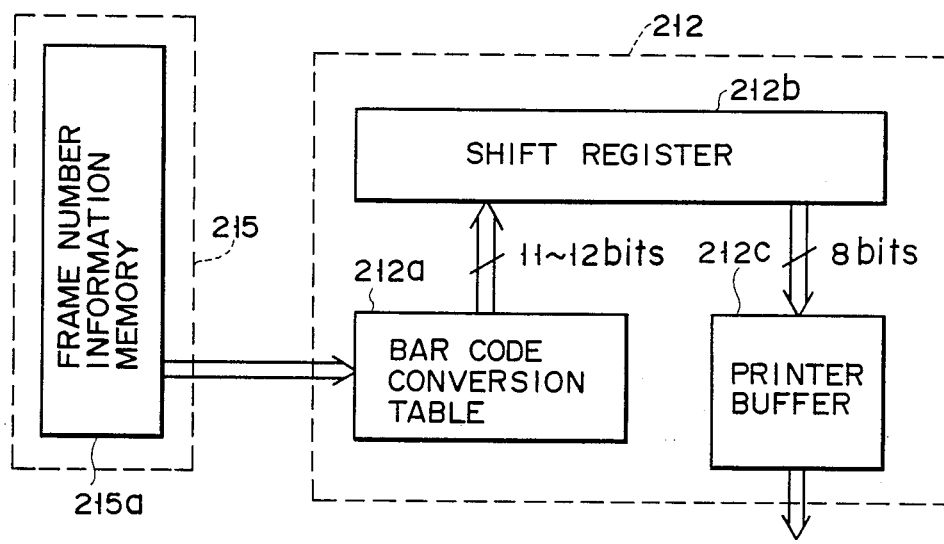
FIG. 9 is a block diagram showing a detailed arrangement of a bar code generator shown in FIG. 4.

In FIG. 9, frame number information read out from frame number information memory 215a of extraction circuit 215 is supplied to bar code conversion table 212a as address data. A bar code pattern obtained from conversion table 212a consists of 11- or 12-bit data per digit, as shown in FIG. 10, and is supplied to shift register 212b to be converted to a continuous bit pattern of the entire frame number information. The conversion output is supplied to printer 23 shown in FIG. 4 through printer buffer 212c and printer output circuit 213, and is printed.

As described above, the present invention is based on fact that frame information of a videotex system includes frame number information. The bar code generating apparatus of this embodiment extracts frame number information from frame information sent from the center to the terminal using frame number information extraction circuit 215. A bar code corresponding to the extraction output is generated by bar code generator 212. The generated bar code is printed by external printer 23 through printer output circuit 213.

Figure 11:
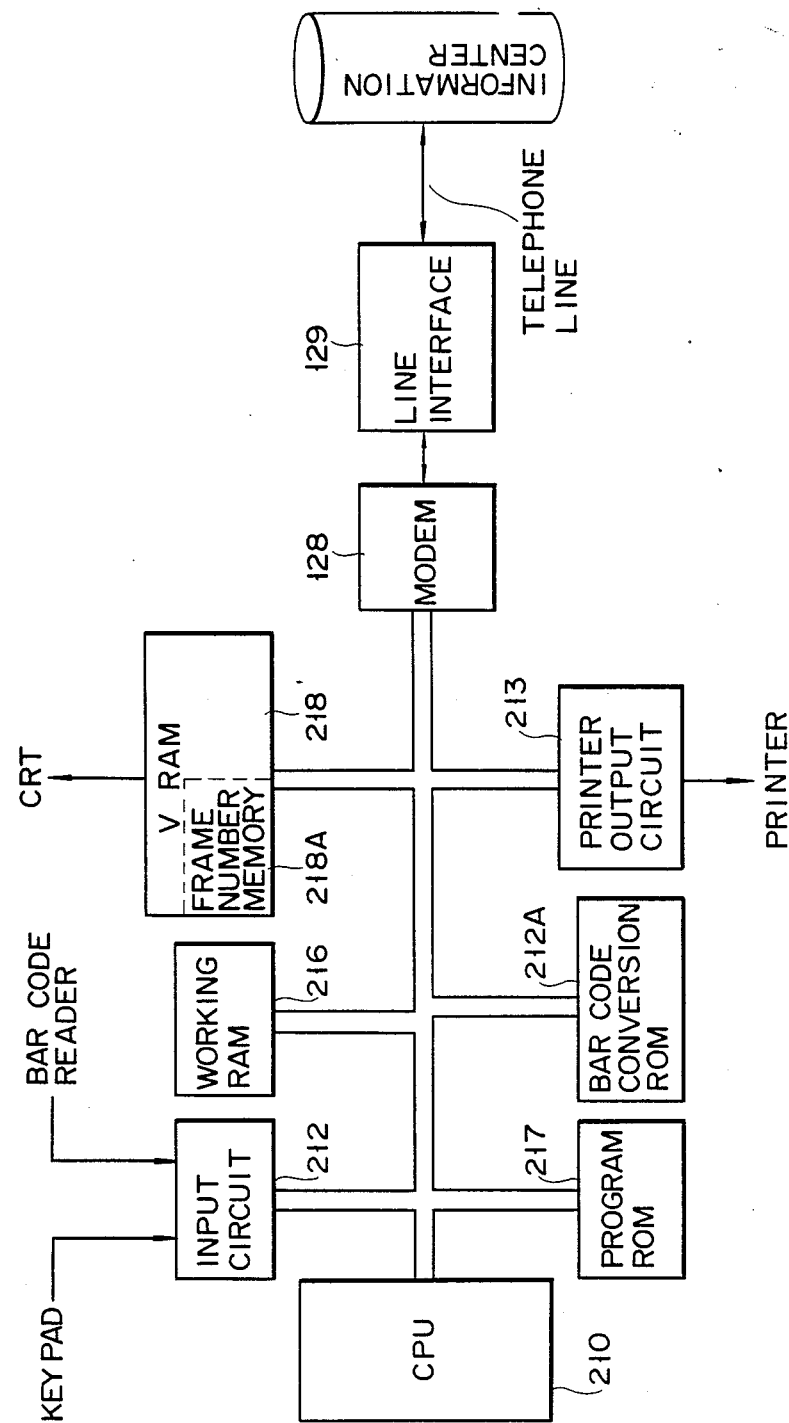
FIG. 11 is a block diagram showing a case wherein a CPU is used for the embodiment shown in FIG. 4.

FIG. 11 is a block diagram when terminal device body 21 is controlled by CPU 210. More specifically, CPU 210 includes bar code generator 212, information processor 214, and frame number information extraction circuit 215, and executes the entire control operation of terminal device body 21. The same reference numerals in FIG. 11 denote the same parts as in FIGS. 2 and 4. CPU 210 is connected to input circuit 212, printer output circuit 213, working RAM 216, program ROM 217, VRAM 218, and MODEM 128 through a bus. VRAM 218 has an area serving as frame number memory 218A. In FIG. 11, reference numeral 212A denotes a bar code conversion ROM. FIGS. 12A and 12B are flow charts of a series of operations executed by CPU 210. The same step numerals in FIGS. 12A and 12B denote the same parts as in FIGS. 3A and 3B. In FIGS. 12A and 12B, bar code generating and print instructing processes are executed by depressing the "BAR CODE" and "PRINT" keys, in steps S10 and S11a. In steps S11b, a bar code extracting process is executed. Processes other than above described processes are similarly executed that of FIGS. 3A and 3B.

As described above, the present invention is designed so that a bar code is generated in accordance with frame number information sent from the information center to the terminal. Therefore, a user need not key-input frame number information. When the user finds frame information that he might want to repetitively access later on a display connected to the terminal, he simply instructs print-out processing while the target frame image is displayed, thereby generating a bar code and printing it by an external printer.

With the above arrangement, a target bar code can be precisely and reliably generated.

In this embodiment, image data of frame information is also supplied to printer 23 in the print mode, and is printed. Therefore, the correspondence between the bar code and frame information can be easily confirmed later.

The embodiment of the present invention has been exemplified. However, the present invention is not limited to the above embodiment.

For example, when a user sets a bar code print mode, a bar code can only be generated and printed. More specifically, it may be appropriately selected whether bar code generator 212, printer output circuit 213, frame number information extraction circuit 215, and printer 23 are set in an ON state in only the print mode or are normally set in the ON state.

Various other changes and modifications may be made within the spirit and scope of the invention.

According to the present invention as described above, a bar code can be internally generated at a terminal by a simple operation.

What is claimed is:

1. A bar code generating apparatus for an image communication terminal device, said apparatus comprising:
    extraction means for receiving image information including frame number information and extracting the frame number information;
    bar code generating means for receiving the frame number information output from said extraction means and generating a corresponding bar code signal;

instruction means for instructing said bar code generating means to generate the bar code signal corresponding to the frame number information; and output means, connected to said bar code generating means, for externally outputting the bar code corresponding to the frame number information generated by said bar code generating means, in response to the instruction from said instruction means, so as to print the bar code signal.

2. An apparatus according to claim 1, wherein said output means is connected to said extraction means and outputs image information from said extraction means, together with the bar code signal.

3. An apparatus according to claim 1, wherein said extraction means repetitively fetches the frame number information in a predetermined cycle, and each time the frame number information is updated, generates new frame number information.

4. An apparatus according to claim 1, wherein said extraction means directly outputs the frame number information extracted from the image information.

5. An apparatus according to claim 1, wherein said extraction means includes first memory means for storing the image information, readout means for reading out the frame number information from said first memory means, and second memory means for storing the frame number information read out from said readout means.

6. An apparatus according to claim 5, wherein said readout means includes address generating means for generating read address data for said first memory means and write address data for said second memory means.

7. An apparatus according to claim 1, wherein said bar code generating means includes bar code conversion table means for receiving the frame number information from said extraction means as address data, and shift register means for receiving an output from said bar code conversion table means.

8. An apparatus according to claim 1, wherein the bar code signal output from said output means is printed by an external printer.

9. An apparatus according to claim 8, wherein the image information is transferred from an information center of a videotex system.

10. An apparatus according to claim 9, wherein a bar code printed material printed on by said printer is used for accessing desired information stored in said information center.

11. An apparatus according to claim 1, wherein said instruction means includes key pad means.

12. An apparatus according to claim 11, wherein said key pad means includes at least one key means for instructing generation of a bar code signal.

13. An apparatus according to claim 12, wherein said key means includes a "BAR CODE" key for instructing bar code signal generation and a "PRINT" key for instructing a bar code signal output.

14. An image communication terminal device comprising:

instruction means for generating an instruction for accessing desired frame number information and instructions for generating and printing a bar code signal corresponding to the frame number information, in accordance with a selective operation;

bar code reader means for reading desired bar code information from a bar code printed material, in accordance with the selective operation;

input means, connected to said instruction means and said bar code reader means, for decoding the instructions and the bar code information;

information processing means for receiving the instruction or the bar code information decoded by said input means, which is used for accessing the desired frame number information, so as to communicate with an external information center, and for performing predetermined processing so as to display image information, including the desired frame number information, transferred from said information center;

extraction means, connected to said information processing means, for extracting the frame number information included in the image information;

bar code generating means, connected to said extraction means and said input means, for generating a bar code signal corresponding to the frame number information extracted by said extraction means, in accordance with the instruction for generating the bar code signal, which is decoded by said input means; and output means, connected to said bar code generating means and said input means, for externally outputting the bar code signal corresponding to the frame number information generated by said bar code generating means, in accordance with the instruction for printing the bar code signal, which is decoded by said input means.

15. A device according to claim 14, wherein said output means is connected to said information processing means and outputs the image information from said information processing means, together with the bar code signal.

16. A device according to claim 14, wherein said extraction means repetitively fetches the frame number information in a predetermined cycle, and each time the frame number information is updated, generates new frame number information.

17. A device according to claim 14, wherein said extraction means directly outputs the frame number information extracted from the image information.

18. A device according to claim 14, wherein said information processing means includes image memory means for storing the image information, and said extraction means includes readout means for reading out the frame number information from said image memory means, and frame number memory means for storing the frame number information read out from said readout means.

19. A device according to claim 14, wherein said readout means includes address generating means for generating read address data for said image memory means and write address data for said frame number memory means.

20. A device according to claim 14, wherein said bar code generating means includes bar code conversion table means for receiving the frame number information from said extraction means as address data, and shift register means for receiving an output from said bar code conversion table means.

21. A device according to claim 14, wherein the bar code output from said output means is printed by an external printer.

22. A device according to claim 21, wherein the information center is an information center of a videotex system.

23. A device according to claim 22, wherein the bar code printed material printed on by said printer is scanned by said bar code reader means, for accessing desired information in said information center, with a bar code.

24. A device according to claim 14, wherein said instruction means includes key pad means.

25. A device according to claim 24, wherein said key pad means includes at least one key means for instructing generation of a bar code signal.

26. A device according to claim 25, wherein said key means includes a "BAR CODE" key for instructing bar code generation and a "PRINT" key for instructing a bar code signal output.

27. A device according to claim 14, wherein said terminal equipment includes CPU means including functions of at least said bar code generating means, said information processing means, and said frame number information extraction means.

* * * * *